(12) United States Patent
Fahrbach

(10) Patent No.: US 11,314,067 B2
(45) Date of Patent: Apr. 26, 2022

(54) ILLUMINATION ARRANGEMENT AND METHOD FOR ILLUMINATION IN A MICROSCOPE AND MICROSCOPE

(71) Applicant: LEICA MICROSYSTEMS CMS GMBH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 394 days.

(21) Appl. No.: 16/462,242

(22) PCT Filed: Nov. 10, 2017

(86) PCT No.: PCT/EP2017/078929
§ 371 (c)(1),
(2) Date: Sep. 3, 2019

(87) PCT Pub. No.: WO2018/087312
PCT Pub. Date: May 17, 2018

(65) Prior Publication Data
US 2019/0391375 A1   Dec. 26, 2019

(30) Foreign Application Priority Data

Nov. 11, 2016 (DE) .................... 10 2016 121 626.7
Dec. 2, 2016 (LU) ........................................ 93332

(51) Int. Cl.
*G02B 21/00* (2006.01)
(52) U.S. Cl.
CPC ................................ *G02B 21/0032* (2013.01)
(58) Field of Classification Search
CPC .. G02B 21/0032; G02B 21/06; G02B 21/006; G02B 21/16; G02B 27/10; G01J 3/02; G01J 3/447; G01J 3/4406
See application file for complete search history.

(56) References Cited

U.S. PATENT DOCUMENTS 7,709,809 B2   5/2010 Kempe
10,054,780 B2   8/2018 Lippert et al.
(Continued)

FOREIGN PATENT DOCUMENTS

CN   101241202 A   8/2008
CN   101485558 A   7/2009
(Continued)

OTHER PUBLICATIONS

Xiang, Yang, "Laser Biology," Hunan Science & Technology Press, China, pp. 175-185, Sep. 1995.
(Continued)

*Primary Examiner* — Mustak Choudhury
(74) *Attorney, Agent, or Firm* — Leydig, Voit & Mayer, Ltd.

(57) ABSTRACT

An illumination arrangement for a microscope includes an illumination input configured to inject an illumination beam bundle and an illumination output configured to output at least two partial beam bundles generated from the illumination beam bundle. At least one diffractive optical element is configured to split the illumination beam bundle into the at least two partial beam bundles that propagate along partial beam paths, and is configured to effect a relative change in respective propagation directions of the at least two partial beam bundles with respect to one another, such that the at least two partial beam bundles output by the illumination arrangement are non-collinear with respect to one another at the illumination output.

17 Claims, 3 Drawing Sheets

(56) References Cited

U.S. PATENT DOCUMENTS

| | | | |
|---|---|---|---|
| 2012/0133937 A1* | 5/2012 | Heintzmann | G01N 21/6458 356/364 |
| 2013/0222801 A1* | 8/2013 | Harel | G01J 3/453 356/328 |
| 2013/0278939 A1 | 10/2013 | Pfister et al. | |
| 2015/0205087 A1 | 7/2015 | Schumann | |

FOREIGN PATENT DOCUMENTS

| | | |
|---|---|---|
| CN | 103282738 A | 9/2013 |
| DE | 102007063274 A1 | 6/2009 |
| EP | 2657747 A1 | 10/2013 |
| EP | 3081975 A1 | 10/2016 |
| WO | 2014026683 A1 | 2/2014 |

OTHER PUBLICATIONS

China National Intellectual Property Administration, "Third Office Action," Patent Application No. 201780082631.4, English translation, pp. 1-8, dated Nov. 15, 2021, China.

* cited by examiner

ILLUMINATION ARRANGEMENT AND METHOD FOR ILLUMINATION IN A MICROSCOPE AND MICROSCOPE

CROSS-REFERENCE TO PRIOR APPLICATIONS

This application is a U.S. National Stage Application under 35 U.S.C. § 371 of International Application No. PCT/EP2017/078929 filed on Nov. 10, 2017, and claims benefit to German Patent Application No. DE 10 2016 121 626.7 filed on Nov. 11, 2016, and Luxembourgian Patent Application No. LU 93332 filed on Dec. 2, 2016. The International Application was published in German on May 17, 2018 as WO 2018/087312 A1 under PCT Article 21(2).

FIELD

The invention relates to an illumination arrangement for a microscope, in particular to a light sheet microscope or SPIM microscope or an oblique plane microscope such as an OPM or SCAPE microscope, comprising an illumination input for injecting an illumination beam bundle and an illumination output for outputting at least two partial beam bundles generated from the illumination beam bundle. The present invention furthermore relates to a microscope, in particular to a light sheet microscope or SPIM microscope or to an oblique plane microscope such as an OPM or SCAPE microscope, and to a method for homogeneously lighting a sample in such a microscope.

BACKGROUND

A light sheet is understood to mean an illuminated region that extends substantially along two spatial directions that are oriented perpendicularly with respect to one another, a length direction and a width direction, wherein the extent of the illuminated region along one thickness direction, oriented perpendicularly to the two spatial directions, is preferably smaller by several orders of magnitude than the extent along the width and length direction of the light sheet. Generally, such a light sheet is attained by focusing a collimated light beam along merely one transverse expanse of the light beam. Cylindrical lenses, achromatic cylindrical lenses or aspherical cylindrical lenses, such as what is known as a Powell lens, can be used herefor.

In a microscope with sample illumination in a plane, such as a light sheet microscope or SPIM microscope, an oblique plane microscope (OPM) or SCAPE microscope, such a light sheet is used to illuminate an illumination plane in a sample, wherein photobleaching or damage to the sample is avoided because no radiation energy is introduced into the sample outside the illuminated illumination plane.

A beam bundle can be considered a model representation of the propagating light, wherein the beam bundle propagates along a propagation direction and has a spatial expanse perpendicularly to the propagation direction. A beam bundle, in particular a beam bundle emitted by laser light sources, typically has a rotation-symmetrical Gaussian transverse beam profile. Other possible beam profiles are for example in the form of a Bessel beam or in the form of a hat top.

When examining heterogeneous samples using a light sheet microscope or SPIM microscope, the scattering and interference of the incident illumination light can significantly deteriorate the image quality. The excitation of fluorophores in the sample is caused by light that has been shaped to form a light sheet. The light sheet can be understood to be a light bundle that is focused in a direction that is oriented perpendicularly to the propagation direction of the light bundle and is consequently formed substantially only in one illumination plane and illuminates the latter. The illumination plane is preferably located in the focal plane of a detection objective with which the scattering light or fluorescence light is detected.

When illuminating with a light sheet, it is possible that clearly visible stripe-shaped shadows form behind strongly scattering or absorbing elements of the sample.

In the prior art, such shadow formation is addressed by virtue of tilting the light sheet sequentially using a mechanical component, such as a tiltable mirror. These solutions have the disadvantage that the mechanical components wear out, which considerably reduces the lifetime of such illumination arrangements.

SUMMARY

In an embodiment, the present invention provides an illumination arrangement for a microscope. The illumination arrangement includes an illumination input configured to inject an illumination beam bundle and an illumination output configured to output at least two partial beam bundles generated from the illumination beam bundle. At least one diffractive optical element is configured to split the illumination beam bundle into the at least two partial beam bundles that propagate along partial beam paths, and is configured to effect a relative change in respective propagation directions of the at least two partial beam bundles with respect to one another, such that the at least two partial beam bundles output by the illumination arrangement are non-collinear with respect to one another at the illumination output.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
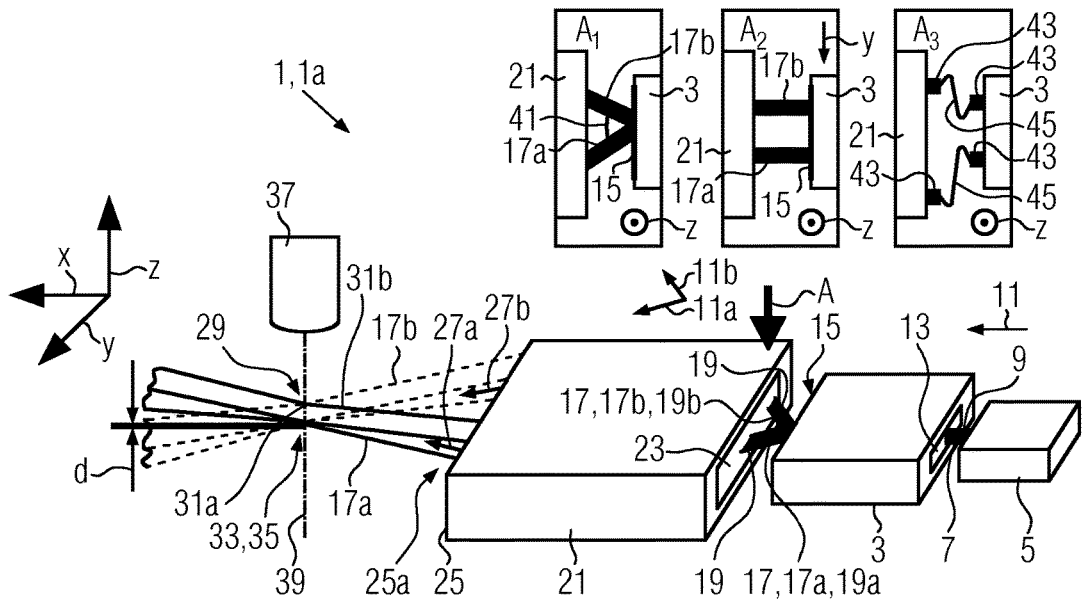
FIG. 1 shows a schematic illustration of an SPIM microscope having an illumination arrangement according to the invention.

The maximally achievable frequencies of the exposure are limited in the sequential illumination of the sample from different directions according to the prior art. This is particularly important when what is known as a virtual light sheet is used to illuminate the sample, that is to say the illumination beam (for example Gaussian, Bessel, Mathieu and Airy beam) is focused in the sample and scanned over the image field during the exposure time of the camera. As is also the case when using fast detectors with image recording speeds in the range of, or faster than, the frequency of the mechanical component, averaging of the regions that have been illuminated sequentially from different directions can here no longer be performed, as a result of which the effect of the shadow reduction is reduced. In the case of a resonant tilt mirror that is typically used for fast deflections, the light is not irradiated uniformly into the sample from all directions because the mirror has an angle-dependent speed, for example follows a sine function, and slows at the reversal points, and vice versa.

In an embodiment, the present invention provides an improved illumination arrangement for a microscope, in particular a light sheet microscope or SPIM microscope or an oblique plane microscope such as an OPM or SCAPE microscope, which makes a high exposure frequency with a long lifetime possible.

The illumination arrangement of the type mentioned in the introductory part achieves these improvements according to an embodiment of the invention by virtue of the illumination arrangement comprising at least one diffractive optical element for splitting the illumination beam bundle into the at least two partial beam bundles propagating along partial beam paths and for effecting a relative change in the propagation directions of the at least two partial beam bundles with respect to one another, with the result that the at least two partial beam bundles output by the illumination arrangement are non-collinear with respect to one another at the output. The microscope according to an embodiment of the invention achieves the above improvements by virtue of an illumination arrangement according to an embodiment of the invention being provided therein.

The method mentioned in the introductory part achieves the improvements according to an embodiment of the invention by virtue of it comprising generating an illumination beam bundle, propagating the illumination beam bundle along an illumination beam path, diffracting and splitting the illumination beam bundle at a diffractive optical element into at least two partial beam bundles propagating along partial beam paths with different propagation directions, reducing the coherence of the light of the at least two partial beam bundles with respect to one another, and radiating the partial beam bundles from different directions into a common illumination plane.

Owing to the non-collinear propagation of the at least two partial beam bundles, the propagation directions of the at least two partial light sheets in the sample also differ. This has the advantage that strongly absorbing or scattering regions of the sample can be illuminated from different directions, with the result that shadow formation behind the strongly absorbing or strongly scattering regions of the sample can be reduced or entirely avoided.

The use of a diffractive optical element furthermore represents an easy-to-realize option for multidirectional illumination of the sample, wherein mechanically moved components that are susceptible to disturbances and under certain circumstances transfer vibrations can be entirely dispensed with. Dispensing with mechanical components makes possible high exposure frequencies with a long lifetime.

The illumination arrangement according to an embodiment of the invention, the microscope according to an embodiment of the invention, and the method according to an embodiment of the invention can be further improved by the following features, which are in each case advantageous per se and are combinable with one another in other embodiments as desired.

A diffractive optical element is understood to mean in particular an individual element, that is to say not an assembly comprising several elements. Diffraction of incident light of a beam bundle occurs at the diffractive optical element, with the result that the illumination beam bundle is split into at least two partial beam bundles. Diffraction preferably occurs at optical elements with substantially spatially periodically changing propagation conditions of the light.

The at least two partial beam bundles can here be identical to one another in terms of some of their properties or have different parameters. The intensities of the light of the at least two partial beam bundles in particular can be set separately. For example, they can also be identical or similar to one another.

The at least two partial beam bundles can be formed to be offset parallel with respect to one another and mutually perpendicularly to the propagation direction at the output of the illumination arrangement, or can propagate at an angle with respect to one another.

The plane defined by the partial beam bundles, or the plane in which both partial beam bundles are located, here corresponds to an unfolded beam path substantially of the illumination plane.

A light sheet generator can be arranged downstream of the illumination arrangement, such that the partial beam bundles leaving the illumination output can be injected into the light sheet generator and transformed by it into at least two partial light sheets. As described above, the transformation of the partial light sheets is preferably effected by means of a suitable cylindrical lens. The cylindrical lens can even be situated in front of the illumination arrangement, such that the light sheet generator transforms a line-shaped intermediate image of the at least two partial beam bundles into the respective partial light sheets.

The light sheet generator can also be configured to produce a previously described virtual light sheet. This is done by a scanning movement of individual partial beam bundles by means of at least one scanning apparatus, such as a scanning mirror. In the method according to the invention, the partial beam bundles that are radiated into the sample from different directions can be, for example, symmetric Gaussian beams or other beams. These can be injected into the light sheet generator and produce partial light sheets. The partial light sheets can also take the form of virtual partial light sheets by virtue of a scanning element scanning the propagation direction of the partial beam bundles and moving for example the focus of each partial beam bundle over and/or through the sample.

For example, the scattering or fluorescence light can be captured by means of an observation optical unit that is oriented perpendicularly to the illumination plane, imaged onto a detector, and preferably be made available for further image processing.

The illumination arrangement according to the invention can be integrated in the microscope by means of a suitable scanning mirror. This permits a compact construction of the microscope beam path and can prevent the examination region for the sample from being limited by the sample illumination. In addition, such a scanning mirror permits the construction of a virtual light sheet and/or the scanning of a light sheet in and/or through the sample.

The illumination arrangement can have stops of different functions, for example field stops and aperture stops, such that further parameters, such as the thickness of the light sheet, are changeable. Said stops can be provided as separate and variable components or be formed by way of optical units of the illumination arrangement. Furthermore, a scanning mirror that tilts all beams of a reflection beam path in the rear focal plane of the objective, that is to say the one opposite the objective or the sample, together by the same angle can be provided in a microscope containing the illumination arrangement.

In a further advantageous embodiment of the illumination arrangement, the diffractive optical element has at least one grating. Gratings with various parameters are available. One possible design parameter for example is the ratio of the intensities or an angle of different orders of diffraction with respect to one another.

In a further advantageous embodiment of the illumination arrangement according to the invention, an individual pulsed light source is provided, at the output of which a pulsed illumination beam bundle is output and injected into the illumination input.

The diffractive optical element produces at least two synchronously pulsed partial beam bundles from the pulsed illumination beam bundle.

A pulsed light source has the advantage that photobleaching of the sample, in particular of the fluorophores, which are excited by the light from the light source and emit fluorescence light, can be counteracted. The excitation, that is to say illumination in the illumination plane, takes place merely during a pulse duration of the pulsed light source, wherein the individual light pulses are produced with a pulse repetition frequency and illuminate the sample with said pulse repetition frequency.

In this way it is possible to prevent not only the photobleaching, but also heating of the sample due to absorption of the light of the illumination beam bundle. This is essential in particular in samples which are examined in vivo, because it is desirable here to keep a disturbance of the sample caused by the examination by way of microscope as minor as possible.

It is furthermore possible to efficiently excite intensity-dependent, typically non-linear processes with pulsed excitation and the pulse peak power occurring in the case of short pulses.

Pulsed light sources that can be used are in particular laser light sources, because these can be used for a wavelength-selective excitation of the fluorophores that are present in the sample or have been additionally introduced into the sample. The laser light source can be operated in what is referred to as continuous wave (cw) operation and be modulated by means of a mechanical modulator, for example a chopper.

Preferably, a pulsed laser can be used. The pulsed laser can be a Q-switched laser or mode-locked laser. Pulse durations of a Q-switched laser generally lie in the nanosecond range, whereas a mode-locked laser makes pulse durations into the femtosecond range possible. The pulsed laser light sources used can have suitable elements for frequency conversion, i.e. for example frequency-doubled or frequency-multiplied.

The use of an individual light source has the advantage that only this light source and not a multiplicity of light sources need be actuated, operated and monitored.

In a further embodiment of the illumination arrangement according to the invention, each of the at least two partial beam bundles is formed by a different order of diffraction of the light of the illumination beam bundle produced by the diffractive optical element. Since the different orders of diffraction of a grating are spatially separated from one another, it is thus possible for the at least two partial beam bundles to be separated from one another in a simple manner.

The different orders of diffraction can comprise in particular the zero order of diffraction, that is to say the part of the illumination beam bundle that is unchanged in terms of its propagation direction.

In the higher orders of diffraction, that is to say the first, second, etc. orders of diffraction, spectral splitting of the light source can additionally take place. In particular short-pulse lasers have a bandwidth that is inversely proportional to the pulse duration.

A grating imparts an angular dispersion on a broadband light source in the higher orders of diffraction, that is to say a wavelength-dependent propagation direction of individual frequencies or wavelengths, such that no discrete number of light sheets is produced, but rather a type of continuous "fans" of light sheets can be produced and used to illuminate the sample. The illumination direction can here be proportional to the spectral shift with respect to a central wavelength.

In a further embodiment of the illumination arrangement according to the invention, a decoherence apparatus for reducing the coherence of the light of the partial beam bundles with respect to one another is provided. The use of a decoherence apparatus has the advantage that the partial light sheets that are radiated from different directions, or the light thereof, do not interfere with one another in the illumination plane. In this way, interference fringes, that is to say local, stationary and temporally stable illumination maxima and illumination minima, in the illumination plane can be avoided and homogeneous illumination of the sample be attained.

The terms coherence and decoherence will be used below. These are not meant to refer to coherence or decoherence of quantum-mechanical systems, but to optical coherence or decoherence.

Two light waves of the same frequency which have a fixed phase relationship with respect to one another are coherent and can interfere, producing a temporally constant interference pattern. In mutually incoherent sources, constructive and destructive interference of individual temporally and spatially limited wave trains, on the other hand, are averaged out, which means that no temporally constant interference patterns can be observed. A distinction is made between spatial and temporal coherence. If a spatially expanded light source exhibits spatial coherence, light portions from various regions of the light source can interfere with one another. It can generally be assumed that spatial coherence is always present in a laser light source.

Temporal coherence indicates the amount by which two or more beam replicas of a light source can be temporally shifted with respect to one another until no more visible interference occurs. Typically, temporal coherence is stated by way of a coherence length. Said coherence length can be a few micrometers (white light) up to kilometers in the case of stabilized laser light sources.

The decoherence apparatus of the illumination arrangement according to the invention is configured to reduce the spatial and/or the temporal coherence of two spatially and/or temporally coherent partial beam bundles with respect to one another.

The decoherence apparatus can be configured as a retardation arrangement, wherein the at least two partial beam paths for the propagation of in each case one partial beam bundle have optical path lengths of different length. Optical path lengths of different length have the advantage that, via them, the temporal coherence of the partial beam bundles with respect to one another can be reduced.

The optical path lengths of the partial beam paths of different length have the effect that a partial beam path is, relative to the at least one further partial beam path, temporally retarded and spatially in the propagation direction.

Optical path lengths of different length can be achieved for example by virtue of partial beam paths of the same length exhibiting different refractive indices or by virtue of beam paths with the same refractive index having different lengths. Optical path lengths of different length can also be achieved by means of folded beam paths. A combination of the above measures is likewise possible.

The illumination arrangement according to the invention can comprise at least one optical waveguide. An optical waveguide has the advantage that, in contrast to a folded beam path which easily becomes misaligned, the light that is coupled into the optical waveguide can be guided therein up to an output coupling facet of the optical waveguide.

The optical waveguide can take the form of a strip-shaped optical waveguide. Preferably, a rotation-symmetrical optical waveguide in the form of a light-guiding cable or fiber can be used. Light-guiding cables have the advantage that they are available with different light-guiding properties and that large optical path lengths can be very easily realized due to their flexibility. For example, light-guiding cables can be wound up onto coils and achieve retardation distances of several meters in a space of the order of magnitude of the minimum diameter of the wound-up light-guiding cable that is determined by the maximum bend.

To simplify the arrangement of the at least two partial beam paths with respect to one another, each of the partial beam paths can comprise an optical waveguide, wherein the optical waveguides of the at least two partial beam paths can have lengths that differ from one another. Due to the different propagation times through the optical waveguides, a temporal retardation of the partial beam bundles with respect to one another occurs at the output of the optical waveguides.

In a further embodiment of the illumination arrangement according to the invention, the optical path lengths of different length of the at least two partial beam paths are configured such that they have a length difference that is greater than or identical to the coherence length of the light of the partial beam bundles. This has the advantage that the partial beam bundles are temporally offset with respect to one another due to the optical path lengths of different length such that they can no longer interfere with one another, that is to say that the partial beam bundles that are radiated into the illumination plane at the same time no longer have a fixed phase relationship with respect to one another.

The difference in optical path lengths with respect to one another can also be referred to as a passage difference, wherein the passage difference can be adapted to the respective coherence length of the light source used. This can advantageously be effected by means of the abovementioned optical waveguides because the lengths thereof can be added to or reduced by the length of further optical waveguides using suitable connection pieces.

The coherence length of the illumination beam bundle is generally identical to the coherence lengths of the partial beam bundles unless measures were taken such as a geometrical or spectral filtering of the partial beam bundles.

If a pulsed light source is provided for injecting the illumination beam bundle into the illumination arrangement, the optical path lengths of the at least two partial beam paths in a further advantageous embodiment of the illumination arrangement exhibit a length difference that is greater than or identical to a path distance that the light travels in a vacuum during a pulse duration of an illumination beam bundle that has been generated in pulsed fashion. This has the advantage that the pulses of the partial beam bundles that correspond to pulse replicas of the illumination beam bundle are retarded with respect to one another such that the pulses of the partial beam bundles in the illumination plane form the at least two partial light sheets not simultaneously but in temporal succession.

Due to this temporal separation of the partial light sheets with respect to one another, they can no longer interfere with one another, and fringe formation due to interference in the illumination plane can be avoided.

The selected passage difference between the at least two partial beam bundles can preferably be greater, for example by the factor two, than the path distance the light travels in a vacuum during the pulse duration.

Such a relatively large passage difference is advantageous in particular when the pulse shape of the illumination beam bundle is not rectangular, but corresponds to a pulse shape that has rising and falling flanks.

Since the pulse durations of pulses having a temporal Gaussian, Lorentz or $sech^2$ profile are generally measured and stated as full width at half maximum (FWHM), it is possible in the case of insufficient passage difference between the two partial beam paths for the falling flanks of the temporal pulse profile to interfere with the rising flank of the second temporal pulse profile of the second partial beam bundle.

A further advantageous realization of the illumination arrangement according to the invention is the at least one grating in the form of a density grating in a crystalline medium or glass. The density grating can be understood to be a periodic arrangement of compressed regions due to an acoustic wave that propagates in the crystalline medium or glass.

The density grating likewise represents a diffractive optical element, because the Bragg reflection occurring at such a density grating is based, like the diffraction at an optical grating, on the Huygens principle.

The acoustic wave or acoustic oscillation is preferably generated by an acoustic oscillator, for example an ultrasonic transducer. The latter can be connected to the crystalline medium or glass by means of a connection layer and thus couple the soundwaves produced thereby into the crystalline medium or the glass.

The longitudinal acoustic wave propagating in the crystalline medium or glass produces, at its wave crests, a compression in the crystalline medium or glass that periodically repeats itself with the sound wavelength.

The density grating should consequently be understood to be a pure phase grating, that is to say that an optical wave that is incident on the density grating merely undergoes a phase change.

The previously described diffraction gratings, however, can also be phase gratings with a fixed periodic structure.

The density grating can preferably be produced in an acousto-optic element (AOE), such as an acousto-optic modulator (AOM) or an acousto-optic deflector (AOD), with the AOE being able to be operated in different operating modes. For example, if it is operated in the Bragg arrangement, merely the first order of diffraction is formed in addition to the zero order. An AOM within the meaning of this application is understood to be an AOE that influences (modulates) incident light in terms of frequency and/or propagation direction and/or intensity in dependence on the soundwaves produced thereby. An AOD is a special type of AOM that is specialized in influencing the propagation direction.

The direction of the first order of diffraction in respect of the original propagation direction of the illumination beam bundle can be changed by way of the selection of the direction of the acoustic wave traveling through the crystalline medium or the glass and the frequency thereof.

In a further advantageous embodiment of the illumination arrangement according to the invention, at least two density gratings are formed in the crystalline medium or in the glass. This has the advantage that the at least two density gratings formed in the AOE can have a different periodicity and/or propagation direction in the crystalline medium or in the glass such that each of the at least two density gratings produces a first order of diffraction of the illumination beam bundle, wherein the orders of diffraction generated by the at least two density gratings can be diffracted in different directions.

Furthermore, the illumination arrangement according to the invention can be further improved by virtue of at least one density grating being moved in relation to the crystalline medium or glass and by virtue of the orders of diffraction of the illumination beam bundle with respect to one another that are produced by the density grating being frequency-shifted.

This has the advantage that the moved density grating consequently simultaneously represents the decoherence apparatus. Since light of the same frequency is incident, such a frequency shift results not in stationary local intensity minima or intensity maxima in the illumination plane but merely in a beat that occurs with the frequency of the soundwaves, that is to say in the range of several 10 to 100 MHz.

Image recording using extremely fast cameras with 10,000 or more images per second is thus not influenced by said beat, because it is averaged by the recording rate of the camera which is slower as compared to the beat.

Sample illumination with a virtual light sheet produced by a resonant scanning mirror (scanning frequency for example 16 kHz) is thus possible.

The frequency shift of the light of the illumination beam bundle is effected with the frequency of the acoustic wave propagating in the crystalline medium or glass, wherein the frequency of the acoustic wave is added to or subtracted from the frequency of the light of the illumination beam bundle in dependence on the direction of incidence of the illumination beam bundle.

If the propagation directions of the acoustic wave and of the illumination beam bundle enclose an angle of less than 90°, the frequency of the light of the illumination beam bundle in the first order of diffraction is reduced by the frequency of the acoustic wave, whereas in the case of an angle between the propagation directions of the acoustic wave and the propagation direction of the illumination beam bundle that is greater than 90°, the frequency of the light of the illumination beam bundle in the first order of diffraction is increased by the frequency of the acoustic wave.

The first order of diffraction of the illumination beam bundle, that is to say the first partial beam bundle, is thus Doppler shifted as compared to the light of the illumination beam bundle.

In a further advantageous configuration of the illumination arrangement according to the invention, the crystalline medium is an anisotropic crystalline medium. It rotates the polarization of the light of the partial beam bundles relative to the polarization of the light of the illumination beam bundle. The anisotropic crystalline medium can in particular be arranged in an AOE.

This has the advantage that differently polarized partial beam bundles have an interference capability that is reduced further due to the different polarizations. This furthermore contributes to the aim of reducing or preventing formation of local illumination minima or illumination maxima in the illumination plane.

An anisotropic crystalline medium, that is to say an anisotropic crystal, has different refractive indices in dependence on the propagation direction of the light in the crystal. The refraction indices for the illumination beam bundle and the partial beam bundle of the first order of diffraction can thus differ, because they propagate through the crystal in different directions.

The anisotropic crystalline medium can be oriented such that the zero order, that is to say the portion of the light of the illumination beam bundle that propagates through the crystal without changing propagation direction, is subject to the same refractive index for each polarization of the light of the illumination beam bundle, whereas the partial beam bundle of the first order of diffraction propagates through the crystal along a propagation direction in which the refractive index is dependent on the polarization of the light.

This dependence of the refractive index on the polarization, i.e. the birefringence, can result in a polarization rotation of the light of the first order of diffraction. In particular, the polarization of the light of the first order of diffraction can be rotated about 90° relative to the polarization of the zero order of diffraction.

Rotation of the polarization of the light of the first order of diffraction can be effected in particular in anisotropic crystals, for example AOEs, which operate in what is referred to as shear mode. In this mode, grating oscillations perpendicular to the propagation direction of the acoustic wave occur, that is to say that the acoustic wave passes through the crystalline medium as a transverse wave. A disadvantage of this mode is the reduced velocity of the transverse wave in the crystalline medium by up to the factor ten as compared to longitudinal waves.

Each of the above-described configurations of the illumination arrangement according to the invention can be mounted in a microscope, in particular a light-sheet microscope or SPIM microscope or oblique-plane microscope such as an OPM or SCAPE microscope. Both the spatial separation of the at least two partial beam bundles and the reduction in the coherence of the light of the two partial beam bundles with respect to one another here ensure that a sample to be examined in the microscope is illuminated homogeneously in an illumination plane, and strongly absorbing or scattering regions of the sample exhibit reduced or no shadow formation.

The present invention will be explained in more detail below with reference to the attached drawings of special embodiments. Identical technical features or technical features having identical technical effects or the same function are here denoted with the same reference sign. The technical features of the configurations illustrated below can be combined with one another as desired or be omitted as long as the technical effect that is achieved by the technical feature is not critical.

FIG. 1 shows a schematic illustration of a microscope 1a, in particular of a light sheet microscope or SPIM microscope 1, comprising an illumination arrangement 3 according to the invention.

The invention is described by way of example on the basis of an SPIM microscope 1, but according to the described configuration can also be used in an oblique-plane microscope such as an OPM or SCAPE microscope.

The SPIM microscope 1 furthermore comprises a light source 5 that emits an illumination beam bundle 7 along an illumination beam path 9.

The illumination beam bundle 7 propagates along a propagation direction 11 that is oriented for the illumination beam bundle 7 parallel with respect to the x-axis.

The illumination beam bundle 7 is injected into the illumination arrangement 3 via an illumination input 13. The illumination arrangement 3 furthermore comprises an illumination output 15, via which, in the configuration of the SPIM microscope 1 shown in FIG. 1, two partial beam bundles 17 are output, wherein the partial beam bundles 17 travel along two different partial beam paths 19, partial beam paths 19a and 19b. The partial beam bundles 17 are divided, for better differentiation, into a first partial beam bundle 17a and a second partial beam bundle 17b.

Each of the two partial beam bundles 17a, 17b propagates along a respective propagation direction 11a and 11b. Both propagation directions 11a, 11b, and the propagation direction 11 of the illumination beam bundle 7 are situated in a plane defined by the x-axis and a y-axis.

The partial beam bundles 17a, 17b output by the illumination arrangement 3 via the illumination output are injected into a light sheet generator 21 via an input 23.

The light sheet generator 21 transforms the partial beam bundles 17a and 17b that were injected via the input 23 such that the partial beam bundles 17a and 17b have a greater width b perpendicular to the respective output-side propagation direction 27a and 27b at the output 25 of said light sheet generator 21 than at the input 23 thereof, with the width b being measured in the x-y-plane.

For better differentiation between the partial beam bundles 17a and 17b on an output side 25a of the light sheet generator 21, a partial beam path 17b is shown in dashes.

Both partial beam paths 17a and 17b extend convergently on the output side 25a of the light sheet generator 21 and each has a focus area 29 that is situated substantially in the x-y-plane. Partial light sheets 31a, 31b that are defined by the respective focus area 29 have a light sheet thickness d along a z-axis that is significantly lower than the extent of the partial light sheets 31a, 31b in the x-y-plane.

The partial light sheets 31a, 31b define an illumination plane 33, in which both light sheets 31a, 31b are located and which is oriented parallel to the x-y-plane. The illumination plane 33 is at the same time a focal plane 35 of an observation optical unit 37.

An optical axis 39 of the observation optical unit 37 is oriented parallel to the z-axis and is perpendicular to the illumination plane 33 or focal plane 35.

FIG. 1 furthermore shows three views A, illustrating a region between the illumination arrangement 3 and the light sheet generator 21.

All three views A show the output coupling of the light by the illumination arrangement 3 and the injection of the light into the light sheet generator 21 along a direction viewed counter to the z-axis.

The view $A_1$ shows one possible configuration of the output coupling of the partial beam bundles 17a and 17b in which both partial beam bundles 17a, 17b extend at an angle 41 in relation to one another.

The view $A_2$ shows the two partial beam bundles 17a and 17b that are output with an offset parallel and mutually laterally along the y-axis by the illumination arrangement 3 at the illumination output 15.

The view $A_3$ shows another possibility for transmitting the light from the illumination arrangement 3 to the light sheet generator 21. The possibility shown in view $A_3$ comprises fiber couplers 43, via which light is coupled into an optical waveguide 45 from the illumination arrangement 3 or can be coupled out of the optical waveguide 45 to the light sheet generator 21.

The possibility for light transmission shown in view $A_3$ thus represents a possibility for setting a lateral offset along the y-axis or an angle 41 between the partial beam bundles 17a, 17b that are guided in the optical waveguides 45 according to the requirements of the light sheet generator 21.

Figure 2:
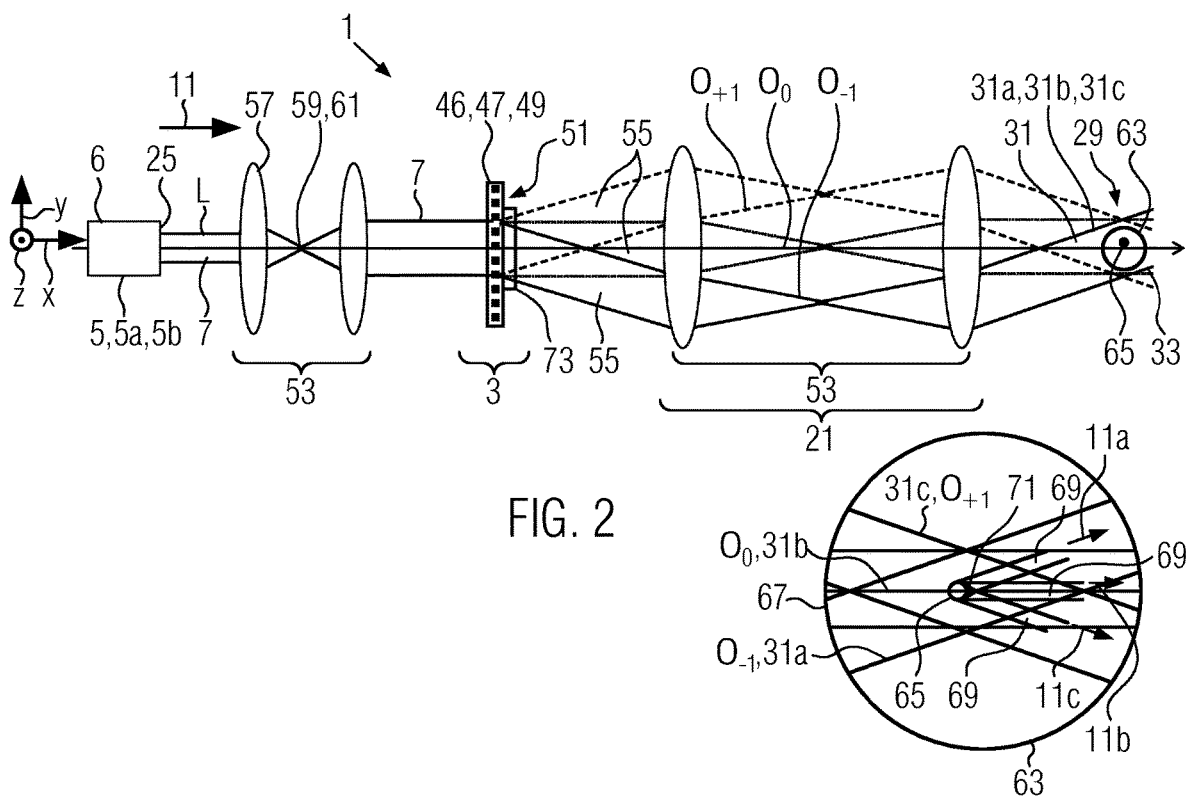
FIG. 2 shows a first configuration of the illumination arrangement according to the invention.

FIG. 2 shows a first configuration of the illumination arrangement 3 according to the invention. It comprises in the embodiment shown merely one diffractive optical element 46 in the form of a grating 47, which in FIG. 2 takes the form of a transmission grating 49. In other configurations, a reflective grating may be used.

A periodic grating structure 51 is merely indicated in FIG. 2.

FIG. 2 furthermore shows the light source 5, which can be embodied in the form of a pulsed light source 6 and outputs the illumination beam bundle 7 at the output 25 and expands it via a telescope 53. The expanded illumination beam bundle 7 is thus incident on a multiplicity of the periodically arranged grating structures 51, producing a plurality of orders of diffraction 55 in the propagation direction 11 downstream of the grating 47. FIG. 2 shows the zero order of diffraction $O_0$, the plus first order of diffraction $O_{+1}$ and the minus first order of diffraction $O_{-1}$.

The orders of diffraction 55 are injected into the light sheet generator 21, transformed by a telescope 53, and shaped in the form of a light sheet 31 in a respective focus area 29. The light sheet 31 is composed of partial light sheets 31a-31c.

In the configuration of parts of the SPIM microscope 1 shown in FIG. 2, the light sheet generator 21 is illustrated in simplified form. The telescope 53, which is arranged downstream of the light source 5, furthermore has a cylindrical lens 57 that collimates the illumination beam bundle 7 emitted by the light source 5 along the y-axis but not along the z-axis. An intermediate image 59 produced in the telescope 53 is thus a line focus 61 extending along the z-axis.

A sample 63 that is illuminated by the partial light sheets 31a-31c in the illumination plane 33 is situated in the focus area 29, in which the partial light sheets 31a-31c overlap.

Sample 63 has a strongly absorbing or scattering region 65, which will be referred to below as disturbance location 65.

The region of the disturbance location 65 is illustrated in enlarged fashion in an enlargement 67, wherein the three light sheets 31a, 31b, 31c that illuminate the sample 63 are schematically illustrated in the form of stripes. As is shown in FIG. 2, the respective light sheets 31 extend over the complete region shown in the enlargement 67 in a manner such that a differentiation between the individual light sheets 31a, 31b and 31c would not be possible without said schematic illustration.

The light sheet 31a is formed by the minus first order of diffraction $O_{-1}$, the second light sheet 31b by the zero order of diffraction $O_0$, and the third light sheet 31c by the plus first order $O_{+1}$.

The light sheets 31a-31c are incident on the disturbance location 65 and form a respective shadow 69 extending in the form of a stripe in the respective propagation direction 11a-11c.

The illumination of the sample 63 from different propagation directions 11a-11c permits the minimization or complete avoidance of a core shadow 71. The core shadow 71 is formed substantially along the propagation directions 11a-11c behind the disturbance location 65 and is shown as a solid area in the enlargement 67.

The light source 5 shown in FIG. 2 can be a laser light source 5a, the latter preferably being a broadband laser light source 5b.

The broadband laser light source 5b in FIG. 2 generates the light of the illumination beam bundle 7 with a bandwidth-dependent coherence length L that can result in the formation of interference in the focus area 29 if no decoherence apparatus 73 is provided.

The decoherence apparatus 73 is only illustrated schematically in FIG. 2. The decoherence apparatus 73 is used to avoid formation of interference in the illumination plane 33, which means that homogeneous illumination of the sample 63 in the illumination plane 33 is possible.

Figure 3:
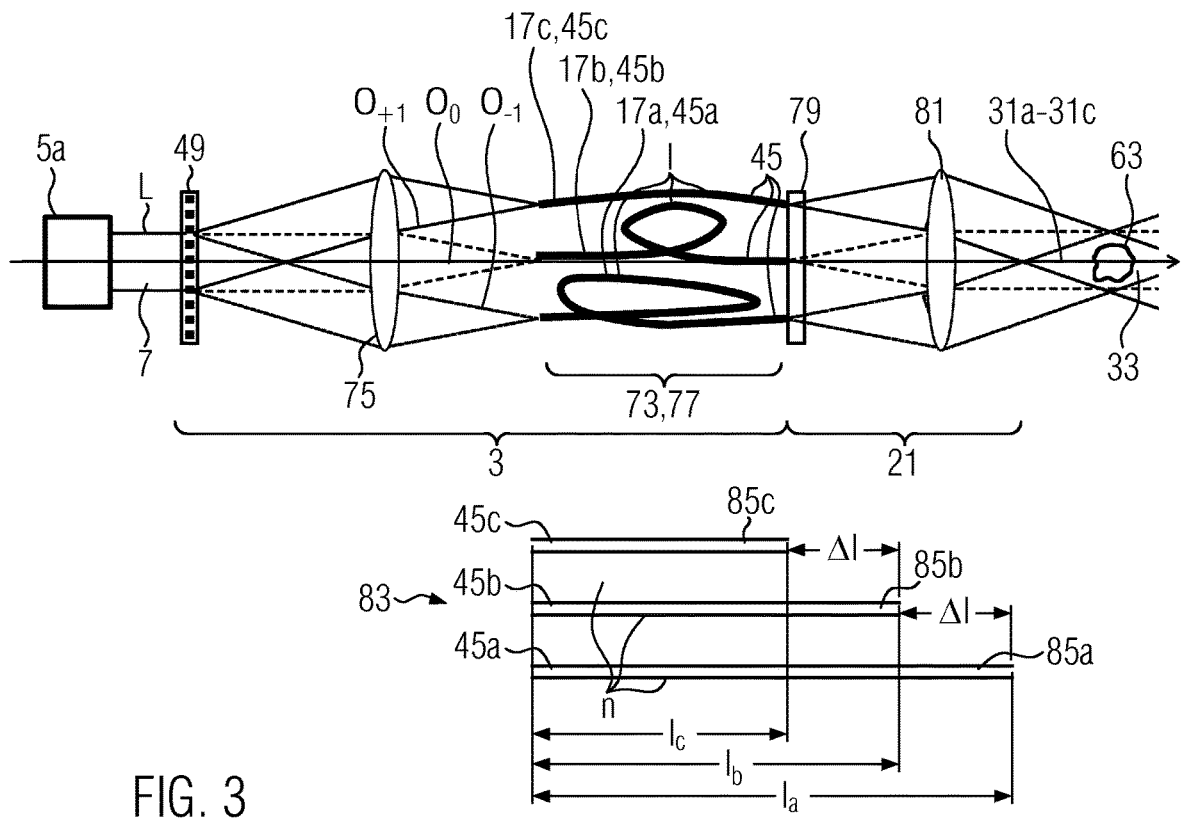
FIG. 3 shows a second configuration of the illumination arrangement according to the invention.

FIG. 3 shows a second configuration of the illumination arrangement 3 according to the invention, wherein the illumination arrangement 3 in this configuration comprises the grating 47, an input coupling lens 75, and a retardation arrangement 77.

The light sheet generator 21 comprises further optical components 79 (illustrated schematically) that comprise for example the previously mentioned cylindrical lens 57 and generate the line-shaped intermediate images 59. The light sheet generator 21 furthermore comprises an illumination lens 81 with which the partial light sheets 31a-31c are generated in the sample 63.

The principle illumination of the sample 63 in the illumination plane 33 is effected as previously described in FIG. 2.

The retardation arrangement 77 of the configuration of the illumination arrangement 3 shown in FIG. 3 represents the decoherence apparatus 73 and comprises three optical waveguides 45, in which in each case one partial beam bundle 17a-17c propagates.

In the configuration shown in FIG. 3, the first partial beam bundle 17a comprising the minus first order of diffraction $O_{-1}$ is coupled into a first optical waveguide 45a. Accordingly, the second partial beam bundle 17b and third partial beam bundle 17c are coupled into a second waveguide 45b and third waveguide 45c. Corresponding fiber couplers 43 (see FIG. 1) are not shown in the schematic illustration of FIG. 3.

The partial beam bundles 17a-17c that are guided via the optical waveguide 45a-45c are injected into the light sheet generator 21.

FIG. 3 furthermore shows that the optical waveguides 45 have a different length l, which is illustrated in FIG. 3 in the stretched state 83 of the optical waveguides 45a-45c.

The optical waveguides 45a-45c of the configuration of the illumination arrangement 3 shown in FIG. 3 have the same refractive index n of the material that is used of the optical waveguide 45. However, the optical waveguides 45a-45c differ in terms of their lengths $l_a$-$l_c$, such that a length difference Δl and different optical path lengths 85a, 85b and 85c are obtained for the three optical waveguides 45a-45c. In the case of the optical waveguides 45a-45c shown in FIG. 3, the respective optical wavelength 85a-85c is obtained by multiplication of the corresponding length $l_a$-$l_c$ times the respective refractive index n, which is identical in the case shown.

The retardation arrangement 77 of FIG. 3 has the effect that the different orders of diffraction $O_{-1}$, $O_0$, $O_{+1}$ are retarded relative to one another and are injected into the light sheet generator 21 at different times. The retardation between the optical waveguides 45a-45c is chosen such that the temporal retardation produced in the retardation section 77 corresponds to a path distance of light in a vacuum that is greater than or identical to the coherence length L of the illumination beam bundle 7 emitted by the laser light source 5b. This path distance is approximately the length difference Δl. Consequently, interference between the light sheets 31a-31c is prevented in the illumination plane 33.

The optical waveguides 45a-45c of the retardation arrangement 77 can be exchanged easily for optical waveguides 45 of greater or shorter length l. As indicated in the example of the optical waveguide 45a, the optical waveguides 45 can be rolled up in a space-saving manner. It is thus possible using the retardation arrangement 77 to ensure adaptation to different coherence lengths L of the laser light source 5a.

Figure 4:
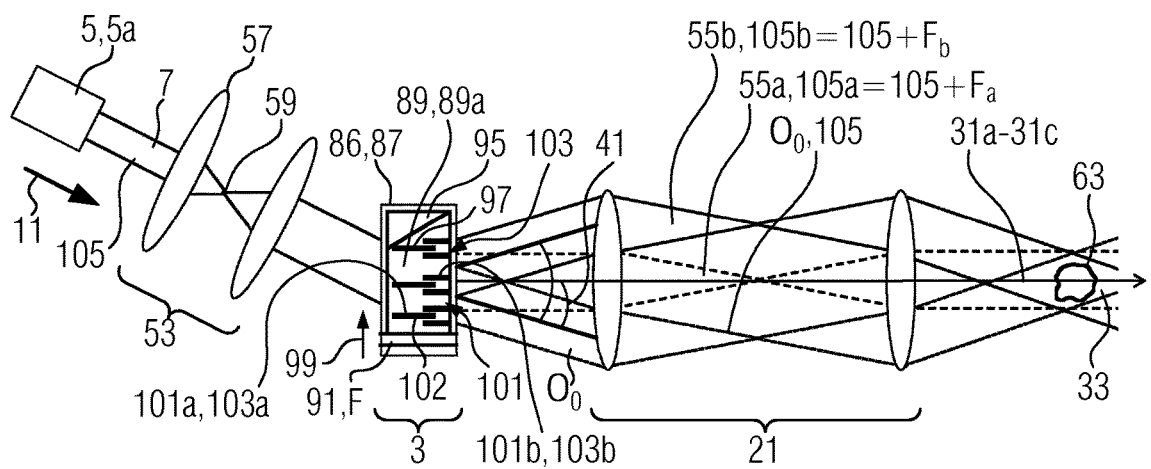
FIG. 4 shows a third configuration of the illumination arrangement according to the invention.

FIG. 4 shows a third configuration of the illumination arrangement 3 according to the invention.

In this configuration, too, a light source 5 or a laser light source 5a generates an illumination beam bundle 7 that produces, by means of the cylindrical lens 57 located in the telescope 53, an intermediate image 59 and expands the illumination beam bundle 7.

The expanded illumination beam bundle 7 is injected into an acousto-optic element (AOE) 86. The AOE 86 for example can be an acousto-optic modulator (AOM) 87 (and in particular an acousto-optic deflector (AOD)), as is illustrated in FIG. 3.

The AOM 87 comprises a crystalline medium or glass 89, a sound transducer 91, actuation electronics 93, and an absorber region 95.

The sound transducer 91 is actuated by means of a frequency generator and produces in the crystalline medium or glass 89 soundwaves 97 that propagate in the crystalline medium or glass 89 along a transmission direction 99. These longitudinal soundwaves 97 form a density grating 101, which is characterized in that it has periodic portions of compressed regions 102 of the crystalline medium or glass 89.

In the configuration of the illumination arrangement 3 shown in FIG. 4, the sound transducer 91 generates a first density grating 101a and a second density grating 101b. Merely for reasons of clarity, these are drawn with a mutual offset in the crystalline medium or glass 89.

The different density gratings 101a and 101b differ substantially in terms of the frequency F that produces them and with which the sound transducer 91 is operated.

The first density grating 101a is operated with a frequency $F_a$, which is lower than the frequency $F_b$, with which the second density grating 101b is produced. This manifests in a different spatial frequency 103 of the compressed regions.

The illumination beam bundle 7 that is incident in the AOM 87 in FIG. 4 is diffracted as per the Bragg condition, wherein, in contrast to the grating 49 used in FIGS. 2 and 3, an individual order of diffraction 55 per density grating 101 is produced.

FIG. 4 furthermore shows the zero order of diffraction $O_0$, which is identical for both density gratings 101a, 101b.

The density grating 101a produced with the lower frequency $F_a$ has a lower spatial frequency 103a than the density grating 101b, which is produced with a higher frequency $F_b$ by the sound transducer 91 and likewise has a higher spatial frequency 103b.

The order of diffraction 55a is produced by the density grating 101a and is diffracted, as compared to the zero order $O_0$, at a smaller angle 41 than the order of diffraction 55b of the density grating 101b.

The density gratings 101 are moved relative to the crystalline medium or glass 89 along the transmission direction 99, such that the light frequency 105 of the illumination beam bundle 7 in the zero order $O_0$ is maintained, but is shifted by the respective frequency $F_a$ or $F_b$ in the orders of diffraction 55a and 55b, wherein a light frequency 105a or a light frequency 105b is obtained as a sum of the light frequency 105 and the respective frequency $F_a$ and $F_b$.

Since the propagation direction 11 of the illumination beam bundle 7 at least partially travels counter to the transmission direction 99 of the soundwaves 97 propagating in the crystalline medium or glass 89, the light frequency 105a and 105b of the orders of diffraction 55a and 55b increases. In other configurations, the transmission direction 99 of the soundwaves 97 can be oriented counter to the transmission direction 99 shown in FIG. 4, wherein in such an arrangement the light frequencies 105a and 105b decrease by the corresponding frequencies $F_a$ and $F_b$.

The partial light sheets 31a-31c produced by the light sheet generator 21 simultaneously illuminate the illumination plane 33 of the sample 63. However, since the light frequencies 105, 105a and 105b differ, no stationery interference patterns occur in the illumination plane 33.

Due to the frequency difference, however, an interference-type beat arises in the illumination plane 33, having a beat frequency in the order of magnitude of the frequencies $F_a$ and $F_b$.

The latter is relatively high as compared to typical recording rates of cameras used to record the illumination plane 33, which means that the camera always averages the beat frequency and consequently does not detect it.

It is furthermore possible that the crystalline medium 89 is an anisotropic crystalline medium 89a that rotates the polarization of the orders of diffraction 55a and 55b relative to the polarization of the zero order $O_0$.

In order to utilize the polarization rotation by an anisotropic crystalline medium 89a, an orientation of the AOM 87 or of the propagation direction 11 of the illumination beam bundle 7 that differs from the arrangement shown in FIG. 4 is necessary.

Figure 5:
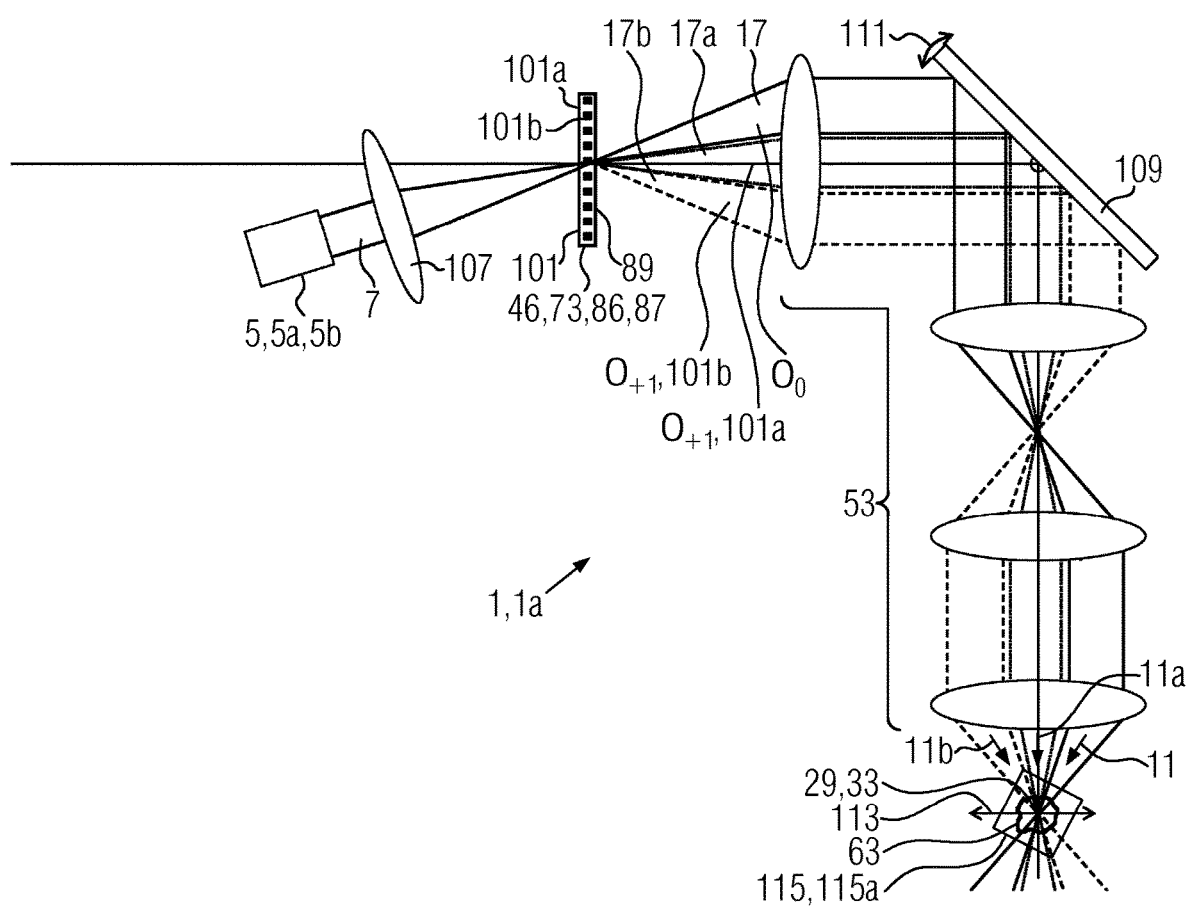
FIG. 5 shows a schematic illustration of an SPIM microscope having an illumination arrangement according to the invention with tilted virtual light sheets.

FIG. 5 schematically illustrates a light sheet microscope or SPIM microscope 1. The light source 5, which may be a laser light source 5a or a broadband laser light source 5b, emits the illumination beam bundle 7 that passes through a lens 107 and is focused thereby. The lens 107 can be a spherical lens 107a or an aspherical lens 107b.

The illumination beam bundle 7 is focused onto a diffractive optical element 46, wherein the diffractive optical element 46 in FIG. 5 is an AOE 86, in particular an AOM 87, in the crystalline medium or glass 89 of which density gratings 101 are produced.

The AOE 86 produces the zero order of diffraction $O_0$, the plus first order of diffraction $O_{+1}$ of the first density grating 101a, and the plus first order of diffraction $O_{+1}$ of the second density grating 101b. The first and second density gratings 101a, 101b are merely indicated in FIG. 5, see in this respect FIG. 4. Similar to the AOE 86 in FIG. 4, it represents the decoherence apparatus 73.

The above orders of diffraction represent the partial beam bundles 17, 17a and 17b that travel along the partial beam paths 19, 19a and 19b and are deflected by a tilt mirror 109, which is tiltable along a tilt direction 111, substantially by 90°.

Using the telescope 53, the partial beam bundles 17, 17a and 17b are focused into the illumination plane 33 in the sample 63, wherein a tilt of the partial beam bundles 17, 17a and 17b along the tilt direction 111 gives the result that the focus areas 29 of the partial beam bundles 17, 17a and 17b are scanned, that is to say moved, along a scanning direction 113 in the sample 63.

Since the scanning in the sample 63 is faster as compared to the integration time of a detector, the movement of the focus areas produces for each of the partial beam bundles 17, 17a and 17b what is known as a virtual light sheet 115, which for the partial beam bundle 17 leads to an indicated first virtual light sheet 115a.

Since the partial beam bundles 17, 17a and 17b are focused into the sample 63 along different propagation directions 11, 11a, 11b, the formed virtual light sheets 115 illuminate the sample 63 from different directions.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An illumination arrangement for a microscope, the illumination arrangement comprising:
  an illumination input configured to inject an illumination beam bundle;
  an illumination output configured to output at least three partial beam bundles generated from the illumination beam bundle;
  at least one diffractive optical element configured to split the illumination beam bundle into the at least three partial beam bundles that propagate along partial beam paths, and configured to effect a relative change in respective propagation directions of the at least three partial beam bundles with respect to one another, such that the at least three partial beam bundles output by the illumination arrangement are non-collinear with respect to one another at the illumination output and homogenously and instantaneously illuminate a sample at an illumination plane; and
a decoherence apparatus configured to reduce coherence of the light of the at least three partial beam bundles with respect to one another.

2. The illumination arrangement as claimed in claim 1, wherein the diffractive optical element has at least one grating.

3. The illumination arrangement as claimed in claim 2, wherein the at least one grating is embodied in the form of a density grating in a crystalline medium or glass.

4. The illumination arrangement as claimed in claim 3, wherein at least two density gratings are formed in the crystalline medium or glass.

5. The illumination arrangement as claimed in claim 3, wherein the at least one density grating is moved relative to the crystalline medium or glass, and wherein the orders of diffraction of the illumination beam bundle that are produced by the density grating are frequency-shifted with respect to one another.

6. The illumination arrangement as claimed in claim 3, wherein the crystalline medium is an anisotropic crystalline medium that is configured to rotate the polarization of the light of the partial beam bundles relative to the polarization of the light of the illumination beam bundle.

7. The illumination arrangement as claimed in claim 1, further comprising an individual pulsed light source configured to output, at an output of the individual pulsed light source, a pulsed illumination beam bundle and inject the pulsed illumination beam bundle into the illumination input.

8. The illumination arrangement as claimed in claim 1, wherein each of the at least three partial beam bundles is formed by a different order of diffraction of the light of the illumination beam bundle that is produced by the diffractive optical element.

9. A microscope comprising the illumination arrangement as claimed in claim 1.

10. The microscope as claimed in claim 9, wherein the microscope is a light sheet microscope, a single plane illumination microscopy (SPIM) microscope, or an oblique-plane microscope.

11. The microscope as claimed in claim 10, wherein the microscope is a swept, confocally-aligned planar excitation (SCAPE) microscope.

12. A method for homogeneously lighting a sample in a microscope, the method comprising:
generating an illumination beam bundle;
propagating the illumination beam bundle along an illumination beam path;
diffracting and splitting the illumination beam bundle at a diffractive optical element into at least three partial beam bundles propagating along partial beam paths with different propagation directions;
reducing coherence of the light of the at least three partial beam bundles with respect to each other; and
radiating the at least three partial beam bundles from different directions into a common illumination plane to homogenously and instantaneously illuminate the sample.

13. The method as claimed in claim 12, wherein the microscope is a light sheet microscope, a single plane illumination microscopy (SPIM) microscope, or an oblique-plane microscope.

14. An illumination arrangement for a microscope, the illumination arrangement comprising:
an illumination input configured to inject an illumination beam bundle;
an illumination output configured to output at least two partial beam bundles generated from the illumination beam bundle;
at least one diffractive optical element configured to split the illumination beam bundle into the at least two partial beam bundles that propagate along partial beam paths, and configured to effect a relative change in respective propagation directions of the at least two partial beam bundles with respect to one another, such that the at least two partial beam bundles output by the illumination arrangement are non-collinear with respect to one another at the illumination output; and
a decoherence apparatus configured to reduce coherence of the light of the partial beam bundles with respect to one another, wherein the decoherence apparatus is embodied in the form of a retardation arrangement, and wherein the at least two partial beam paths have optical path lengths of different length for the propagation of in each case one partial beam bundle.

15. The illumination arrangement as claimed in claim 14, wherein the retardation arrangement comprises at least one optical waveguide.

16. The illumination arrangement as claimed in claim 14, wherein the optical path lengths of the at least two partial beam paths exhibit a length difference that is greater than or equal to the coherence length of the light of the partial beam bundles.

17. The illumination arrangement as claimed in claim 14, wherein the optical path lengths of the at least two partial beam paths exhibit a length difference that is greater than or equal to a path distance that the light travels in a vacuum during a pulse duration of an illumination beam bundle that is generated in a pulsed fashion.

* * * * *